United States Patent [19]

Weber

[11] 4,275,682
[45] Jun. 30, 1981

[54] PEANUT SEED TREATING MACHINE
[75] Inventor: Joseph A. Weber, Arlington, Tex.
[73] Assignee: Gustafson, Inc., Dallas, Tex.
[21] Appl. No.: 129,031
[22] Filed: Mar. 10, 1980
[51] Int. Cl.[3] ............................................. B05C 5/00
[52] U.S. Cl. .................................... 118/303; 118/314
[58] Field of Search ............... 118/303, 24, 315, 323, 118/314; 239/224; 134/187, 193; 366/155, 168, 171, 172

[56] References Cited

U.S. PATENT DOCUMENTS

| | | | |
|---|---|---|---|
| 1,294,909 | 2/1919 | Howell | 118/303 X |
| 2,862,511 | 12/1958 | Forsberg | 118/303 X |
| 2,953,359 | 9/1960 | Mau | 118/303 X |
| 3,155,542 | 11/1964 | Cordell et al. | 118/303 |
| 3,912,231 | 10/1975 | Weber | 118/303 X |

Primary Examiner—John P. McIntosh
Attorney, Agent, or Firm—Dale H. Palmatier

[57] ABSTRACT

A peanut treating machine including a supply bin with a hopper bottom, a peanut distributing conical plate distributing peanuts into an annular curtain of free falling peanuts; a high speed rotor with upper and lower discs from which liquid chemical treatment is emitted, the upper disc having larger diameter than the lower disc and having flutes which are substantially deeper in an axial direction than the lower disc; and the upper disc having holes near its inner periphery to provide for the flow of liquid chemical treatment downwardly through the holes so that the liquid chemical treatment is emitted from both top and bottom surfaces of the upper disc in fine particles.

6 Claims, 5 Drawing Figures

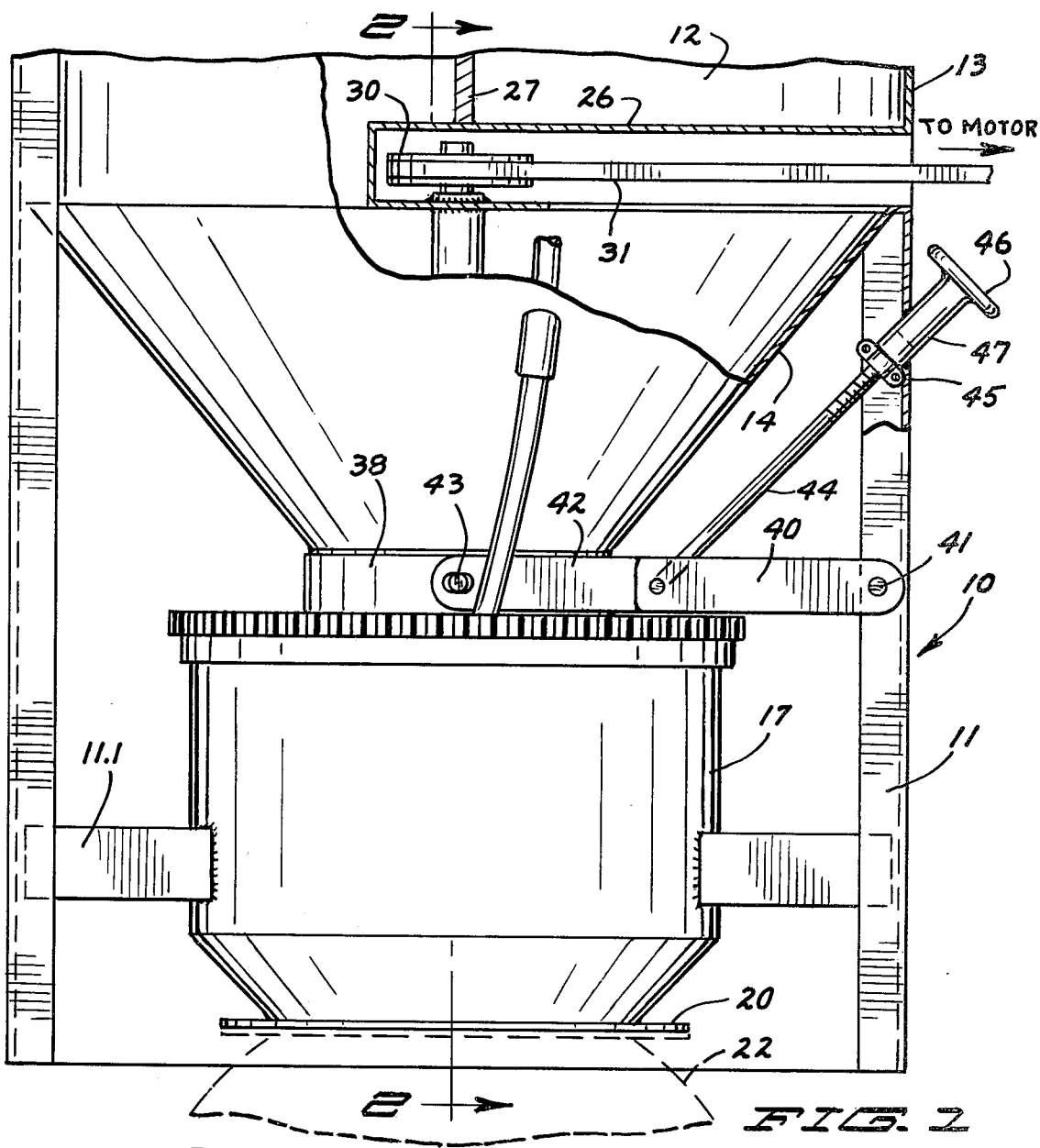
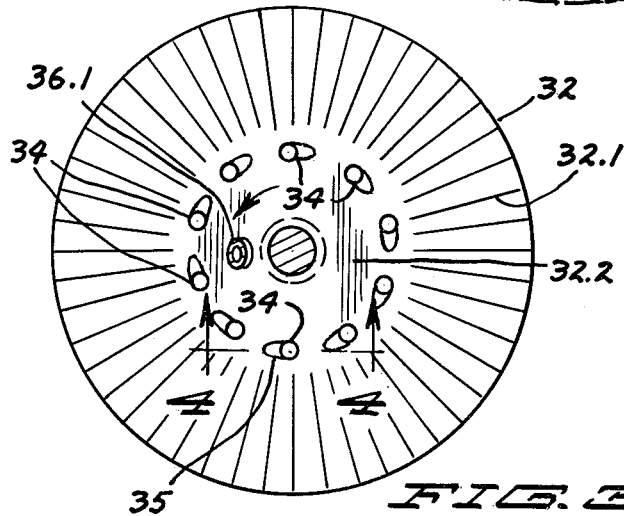
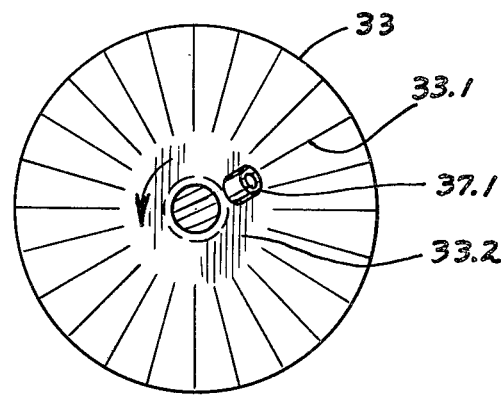

PEANUT SEED TREATING MACHINE

BACKGROUND OF THE INVENTION

Treating of seeds with liquid type chemical treatments has been common practice in respect to many agricultural crops, such as corn, small grains including wheat, oats, flax, etc. On the other hand, peanut seeds have traditionally been treated by applying dry dust including the necessary chemicals as fungicides. Dust has been used in treating peanut seeds because the thin outer membrane called the testa is very fragile and must necessarily remain intact and in place, and until recently it has been believed that no liquid type chemical treatments could be used in treating peanuts because it has been believed that the use of liquid type chemical treatments would tend to damage the testa and materially reduce the likelihood of seed germination.

It has recently been determined that peanut seeds may be effectively treated with liquid type chemical treatments wherein the chemical products are in a collidal suspension with a primarily oil base. However, known equipment has not proved satisfactory for treating peanuts.

The testa of many seeds is very rough, with deep fissures. Also, peanut seeds are extremely large and must be thoroughly coated with the chemical treatment, even though the actual quantity of the treating liquid applied is relatively small. Of course, the seeds cannot be roughly handled or jostled excessively.

Prior art seed treaters have not been adequate for treating peanut seeds for various reasons. Typically, prior seed treaters have not been able to apply an adequate amount of the liquid chemical treatment in the manner required. Representative known prior treaters are found in U.S. Pat. No. 2,862,511; 2,935,359; 3,155,542 and 3,912,231.

SUMMARY OF THE INVENTION

An object of the invention is to provide a new and improved apparatus for applying liquid chemical treatments to peanut seeds.

Another object of the invention is to provide a novel apparatus for applying an adequate amount of liquid treatment to thoroughly coat the testa around the entire periphery of the seed.

A feature of the present invention is the guiding of the peanut seeds to fall by gravity in an annular curtain of falling seeds, initially applying an extremely fine mist of liquid treatment to the seed, and then subsequently applying another much heavier coating of the liquid treatment by directing a significantly more intense mist or spray to the curtain of falling seeds.

Another feature of the invention is the provision, in a closed treating chamber, of a guide for directing the peanuts to fall in an annular curtain, a pair of vertically spaced rotary discs embraced by the curtain of falling peanuts and spinning at high speed, separate conduits directing treating liquid onto both of the discs, the upper disc being larger than the lower disc and having deeper radial flutes than the lower disc, to produce an extremely fine mist directed outwardly to the falling peanuts, and the upper disc also having apertures around the inner periphery to cause the liquid chemical treatment to be propelled in a mist from both the top and bottom surfaces of the lower disc, thus making a heavy application of the liquid treatment to the seeds in the curtain, the shallower flutes and smaller diameter of the lower disc causing the liquid chemical treatment to be misted, but with larger particle sizes.

An advantage is obtained by the construction according to the present invention in that the liquid chemical treatment is first thoroughly applied in a light coating to the peanuts, and this light coating will penetrate the testa and be at least partially dried before the second heavier application is made, which thoroughly covers the seed.

Another advantage is obtained with the apertures around the inner periphery of the upper disc in that by using both the top and bottom surfaces of the disc for flinging the treating liquid toward the falling curtain of peanuts, the effective capability of the upper disc is substantially doubled, that is, the quantity of liquid delivered while still producing a fine mist, is substantially doubled.

DESCRIPTION OF THE DRAWINGS

FIG. 1 is an elevation view of the seed treating machine with a portion thereof broken away for clarity of detail;

FIG. 3 is an enlarged detail section view taken approximately at 3—3 of FIG. 2;

FIG. 5 is an enlarged detail section view taken approximately at 5—5 of FIG. 2.

DETAILED SPECIFICATION

Figure 2:
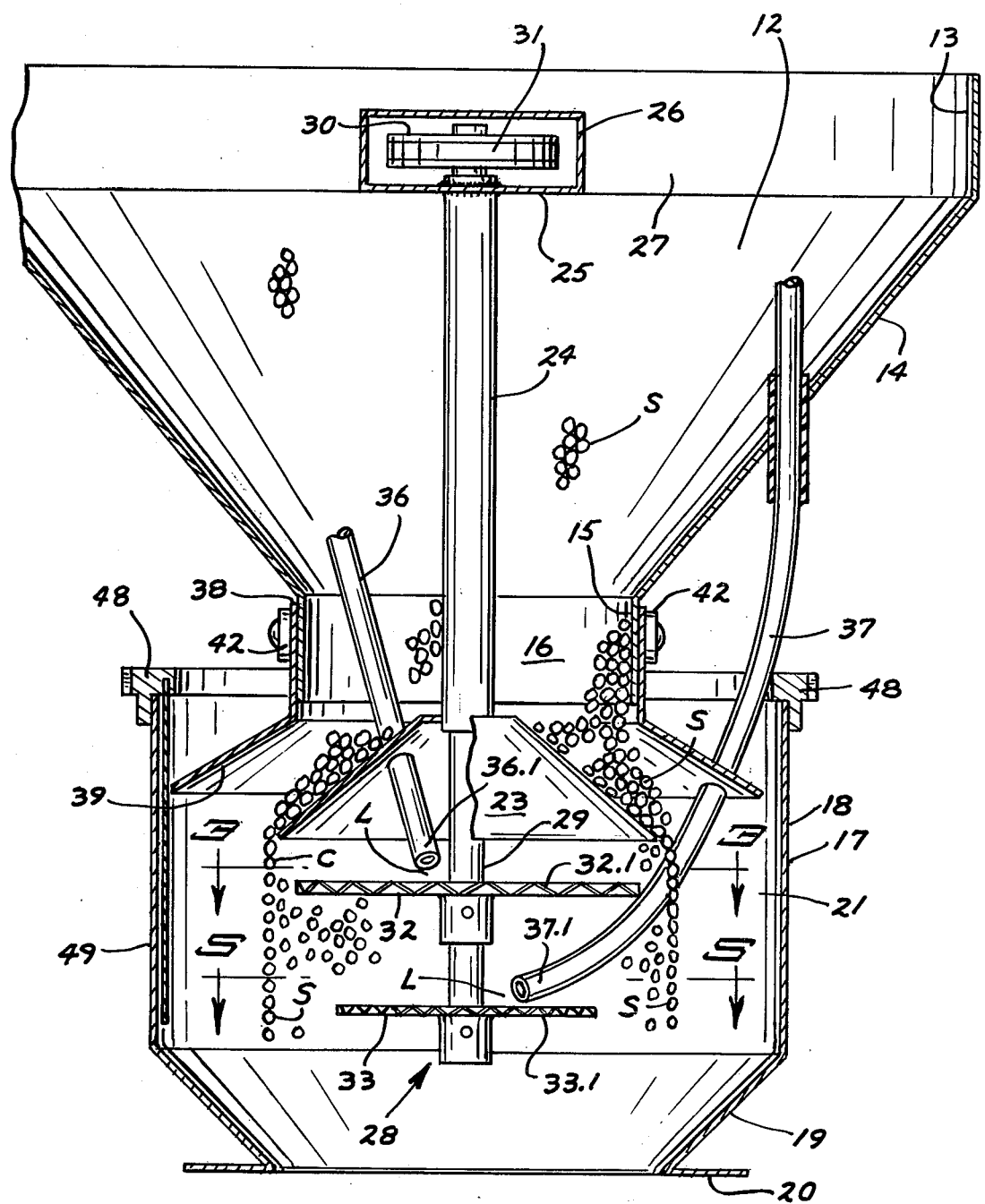
FIG. 2 is a detail section view taken approximately at 2—2 of FIG. 1.

One form of the invention is illustrated in the drawings and is described herein. The seed treating machine is indicated in general by numeral 10, and includes a frame 11 which is generally rectangular, and a supply bin 11 is defined by rigid sidewalls 13 for supplying the seeds to be treated. The bin 12 has a downwardly converging hopper bottom 14 which terminates at its bottom end in a cylindrical wall 15 to define the supply throat 16 through which all of the seeds S are supplied.

An upright housing 17 is affixed to the frame 11 by brackets 11.1 beneath the hopper bottom 14 for receiving the seeds therefrom. The housing 17 has an upright cylindrical wall 18 and a downwardly convergent hopper bottom 19 with an annular flange 20 at the lower extremity thereof for connection to other equipment to be mounted below the treating machine. The housing 17 defines a cylindrical interior treating chamber 21 with an open upper inlet end to receive the seeds from throat 16, and an open discharging lower end from which the seeds will exit the treating chamber 21.

The bottom flange 20 will be connected to another piece of equipment 22 such as a tumbling barrel for receiving the newly treated seeds and causing the seeds to be rolled and tumbled together prior to the bagging of the treated seeds.

A stationary cone-shaped seed distributing panel 23 is mounted in the treating chamber 21 so that the exterior cone-shaped face thereof diverges in a downward direction and converges upwardly toward the throat 16. The lower periphery of the distributing plate 23 has a diameter slightly larger than the diameter of throat 16 so that the seeds S which move by gravity downwardly through the throat 16 and onto the distributing panel 23 are caused to tumble and roll downwardly along the periphery of the panel 23 and over the edge thereof.

The seeds which fall by gravity from the lower edge of the distributing panel 23 are arranged in a cylindrical curtain C of freely falling and tumbling seeds S.

The distributing panel 23 is supported by and is affixed to as by welding, a vertical mounting sleeve 24, the upper end of which is affixed as by welding to a rigid panel 25 which is a part of a rigid tunnel structure 26 mounted on the frame 11 of the machine and extending to the exterior thereof as illustrated in FIG. 1. Another bar-shaped brace 27 extends across the width of the chamber 12 and is welded at its opposite ends to the upright wall of the housing and is thereby supported by the frame. The bar 27 is affixed as by welding to the inner end of the tunnel structure 26 and thereby lends support to the tube 24 which carries the conical distributing panel 23.

A high speed rotor 28, revolving at a rate of approximately 2500 to 2600 rpm is located immediately beneath the conical distributing panel 23 and is mounted on an upright shaft 29 extending concentrically through the stationary mounting tube 24. Suitable bearings or bushings are provided at the top and bottom of the tube 24 for mounting the high speed rotary shaft 29. Shaft 29 has V-belt pulley 30 on its upper end driven by a V-belt 31 which extends through the tunnel structure 26 and outwardly of the machine to a suitable source of rotary power such as an electric motor.

The motor 28 incorporates a pair of high speed fluted circular discs 32 and 33. It will be seen that the upper disc 32 is significantly larger in diameter than the lower disc, and that the flutes 32.1 are significantly deeper in the upper disc than are the flutes 33.1 in the lower disc. In one form of the invention, the upper disc may be approximately six inches in diameter while the lower disc may be approximately four and one-half inches in diameter; and the upper disc 32 will have flutes which are considerably deeper in an axial direction such that the overall thickness of the fluted upper disc may be approximately 0.250 inches; whereas the overall thickness of the fluted lower disc may be approximately 0.093 inches.

It will be recognized that the central portions 32.2 and 33.2 of the upper and lower discs are flat and planar while the flutes 32.1 and 33.1 extend from the inner central portions to the outer peripheries of the discs.

Figure 4:
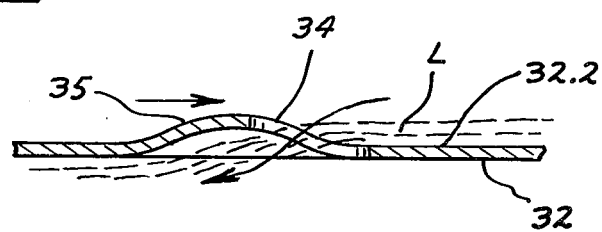
FIG. 4 is an enlarged detail section view taken approximately at 4—4 of FIG. 3.

The upper disc 32 has a plurality of holes 34 around the periphery of the inner planar portion 32.2 thereof to provide for flow communication between the upper and lower surfaces of the disc 32. As particularly shown in FIG. 4, the disc 32 is deformed adjacent each of the apertures 34 as indicated at 35 so as to form a scoop-like vane or protrusion above the plane of the flat central portion 32.2 whereby to direct and encourage flow of the liquid chemical treatment L through the adjacent hole 34 so as to migrate across the bottom surface of the disc as it is revolving at high speed.

Supply ducts 36 and 37 have their delivery ends 36.1 and 37.1 located immediately above the central portions of the upper and lower discs 32 and 33, respectively. The two supply ducts 36 and 37 are connected to a suitable source of liquid chemical treatment to be applied to the seeds, and such source of liquid chemical treatment will incorporate a metering apparatus to coordinate the flow of the liquid chemical treatment with the movement of speeds S downwardly through the throat 16. The liquid treatment measuring and metering apparatus is well known type of equipment and need not be illustrated for purpose of the present invention.

A cylindrical collar 38 embraces the exterior of the annular wall 15 which defines the seed throat 16, and the collar 38 has a downwardly flared conical retarder panel 39 affixed thereon. The retarder panel 39 and collar 38 are capable of moving upwardly and downwardly toward and away from the distributor panel 23 for the purpose of regulating the quantity of seeds which are allowed to flow downwardly through the throat 16 and over the panel 23. As the retarder panel 39 is moved downwardly, closer to the distributor panel 23, the number of peanut seeds which are allowed to flow is reduced, and as the retarder panel 39 is raised upwardly, the peanut seeds may flow more freely and in greater quantity. The vertical position of the collar 38 and of the retarder panel 39 is controlled by a tiltable lever arm 40 pivoted at 41 to the frame 11. The lever arm 40 has a bifurcated inner end 42 connected by pivot pins 43 to the collar 38. The vertical position of the lever arm and the collar 38 is controlled by a threaded rod 44 connected to the arm 40 and guided through a slide bearing 45 on the frame 11. A hand wheel 46 has a threaded nut 47 embracing the threaded rod 44 so that as the hand wheel 46 is turned, the arm 40 and collar 38 are raised or lowered.

In operation, the flow of seeds downwardly through the bin and hopper are coordinated with the desired flow of liquid chemical treatment which flows through the ducts 36 and 37. The seeds S tumble and roll off the peripheral edge of the distributor panel 23 and form themselves into a freely falling curtain C of seeds S.

The peripheral gear 48 rotatably mounted at the upper edge of the housing sidewall 18, is continuously slowly driven so that the depending rod 49 continually traverses the entire periphery of the interior sidewall 18 and continuously loosens any accumulated seed treatment or other debris such as accumulated dust, and other particles.

The rapidly spinning discs 32 and 33 produce a mist of the liquid chemical treatment L flowing from the ducts 36 and 37 and sling the mist from the peripheries of these discs 32 and 33.

Although both of the discs 32 and 33 are rotating at the same rotary speed, the mist which is emitted from the periphery of the upper disc 32 has much finer particles than does the mist which is emitted from the periphery of the lower disc 33. There are several aspects of the upper disc which contribute materially to the fineness of the mist emitted from the disc 32. The diameter of the outer periphery of the disc 32 exceeds by a substantial margin the diameter of the lower disc 33, and as a result, the periphery of the upper disc has a substantially greater lineal speed than the periphery of the lower disc. This substantially greater lineal speed contributes materially to making the mist emitted from the upper disc substantially finer than the mist emitted from the lower disc. In addition, the flutes 32.1 in the upper disc are substantially deeper in an axial direction than the flutes in the lower disc. The deepness of these flutes 32.1 produce a substantially greater turbulence of the mist particles which are emitted from the periphery of disc 32 and also of the adjacent air in the chamber 21. The whirling and turbulence of the air and mist particles reduces the size of the mist particles and causes substantial whirling and turbulence of the air and mist outside of the curtain C of falling seeds as well as within the curtain.

Furthermore, the holes 34 in the upper disc 32 and the scoop-like protrusions 35 adjacent each of the holes 34 cause significant amounts of the liquid chemical treatment L from the duct 36 to flow to the bottom surface of the disc 32 as well as to flow outwardly on the upper surface of the disc 32. As a result, significant amounts of the liquid flow radially across the flutes of the upper disc and to the periphery thereof. This also contributes materially to the fineness of the mist particles emitted from the periphery of disc 32.

The mist which is produced and emitted from the lower disc 33 has substantially larger particles and is substantially less turbulent and moves with less velocity than the mist emitted from the upper disc.

The result, as relates to the seeds S, is that the seeds are coated, lightly, and around their entire peripheries, as they pass by the upper disc 32. The seeds rolling and tumbling falling from the distributor plate 23, and the fine high speed very turbulent mist emitted from the disc 32 penetrates through the curtain C between the seeds S and is caused to be directed against all portions of the periphery of each of the seeds S as it passes by. It will be recognized that the testa of each of the peanut seeds may be deeply fissured, and it is important that this very finely particilized mist penetrate into all of the fissures and this first application of liquid chemical treatment is absorbed into the testa of each of the seeds. There is substantial penetration of the treatment into the testa of each seed.

Subsequently, as the seeds pass by the lower disc 33, substantially greater quantities of courser mist particles are applied to the seeds. The distribution of the mist particles from the disc 33 onto each of the seeds is somewhat less thorough than the mist particles which are emitted from the upper disc 32. However, the necessary quantities of the liquid chemical treatment are applied to each seed and to the seeds as a whole. The seeds will then travel downwardly through the hopper bottom 19 of the housing and will move downwardly into the drum 22 where the seeds are tumbled about and against each other and rolled around so as to cause the second application of liquid chemical treatment from the disc 33 to be spread around equally among all of the seeds. It will be seen that the seed treating machine is provided with stacked discs from which a light coating of the liquid chemical treatment is first applied to the seeds and then a heavier coating is applied from the lower disc. The coating applied initially, although light, thoroughly covers each of the seeds and is caused to penetrate into the testa of the peanut seeds and into all of the fissures thereof.

What is claimed is:

1. A treating machine for applying liquid chemical treatment to peanut seeds and the like, comprising
   seed supply means having a restricted outlet throat through which seeds are allowed to flow by gravity,
   a housing beneath the throat defining a seed treating chamber having a top inlet and a bottom outlet for the seeds, the throat directing the seeds into the treating chamber,
   seed directing means in the treating chamber and beneath the throat in confronting relation thereto, the seed directing means establishing an annular curtain of falling and revolving seed in the treating chamber,
   a pair of supply ducts extending into the treating chamber and directing streams of the liquid chemical treatment therein,
   a high speed rotor in the treating chamber and revolving on a vertical axis, the rotor being located beneath the seed directing means and thereby embraced by the annular curtain of free falling seeds, and the rotor having a pair of vertically spaced upper and lower spinning discs each beneath the delivery end of a respective supply duct to receive the stream and sling the liquid chemical treatment outwardly onto the falling seeds,
   the upper disc having a diameter larger than the diameter of the lower disc and having radial flutes which are substantially deeper in an axial direction than the flutes in the lower disc, whereby the upper disc breaks up the liquid chemical treatment into finer mist particles and produces a more intense whirling and turbulent motion of the treatment mist and air than does the lower disc, for applying a first light coating of the liquid chemical treatment on the seed adjacent the upper disc and then a second heavier coating of the treatment on the seed adjacent the lower disc.

2. The treating machine according to claim 1, and the delivery ends of the ducts being disposed adjacent the central portions of the respective upper and lower discs.

3. The treating machine according to claim 1, and the upper disc having a plurality of holes therethrough adjacent the delivery end of the respective supply duct, the holes permitting flow of the liquid chemical treatment to the lower surface of the spinning disc to sling the liquid chemical treatment simultaneously from both top and bottom surfaces of the disc.

4. The treating machine according to claim 3, and the upper disc also having scoop-shaped deformations protruding upwardly of the upper surface of the disc adjacent the peripheries of the holes to direct the flowing liquid chemical treatment onto the lower surface of the disc.

5. A treating machine for applying liquid chemical treatment to peanut seeds and the like, comprising
   seed supplying means directing a gravity flow stream of seeds downwardly.
   a housing beneath the throat and defining a seed treating chamber having a top inlet and a bottom outlet for the seeds, the supply means directing the seeds through the inlet into the treating chamber,
   seed directing means in the treating chamber and beneath and in confronting relation to the supply means and directing the seeds into an annular curtain of freely falling and tumbling seeds in the treating chamber,
   a pair of supply ducts extending into the treating chamber and directing streams of the liquid chemical treatment therein,
   a high speed rotor in the treating chamber and revolving on a vertical axis, the rotor being located beneath the seed directing means and thereby embraced by the annular curtain of free falling seeds, and the rotor having a pair of vertically spaced upper and lower spinning discs, each located beneath the delivery end of a respective supply duct to receive the stream of liquid chemical treatment and to sling the liquid chemical treatment outwardly onto the falling seeds, the upper disc having a diameter larger than the diameter of the lower disc, and both of the discs having generally radially directed flutes extending from the central portions of the discs toward the outer peripheries thereof, the upper disc having a multiplicity of holes therethrough adjacent the central portion of the disc to allow flow of the liquid chemical treatment through the disc for flow along the bottom surface of the disc as well as over the upper surface of the disc, whereby the upper disc breaks up the liquid chemical treatment into substantially finer mist particles than the lower disc and both of the discs producing turbulent movement and whirling of the liquid chemical treatment mist and air in the treating chamber to apply a first light coating of the liquid chemical treatment onto the seeds adjacent the upper disc and then a second heavier coating of the treatment on the seeds adjacent the lower disc.

6. The treating machine according to claim 5, and the larger diameter upper disc having radial flutes which are substantially deeper in an axial direction than the flutes of the lower disc.

* * * * *